United States Patent

Fujita

[15] 3,678,680

[45] July 25, 1972

[54] AN ELECTRONIC TIMEPIECE

[72] Inventor: Kinji Fujita, Nagano, Japan

[73] Assignee: Kabushiki Kaisha Suwa Seikosha, Tokyo, Japan

[22] Filed: Feb. 24, 1971

[21] Appl. No.: 118,333

[30] Foreign Application Priority Data

Feb. 3, 1970 Japan....................................45/17120

[52] U.S. Cl. ....................................................58/23 R, 58/34

[51] Int. Cl. ..........................................G04c 3/00, G04c 9/00

[58] Field of Search.................58/23 R, 23 A, 34, 35 R, 50 R

[56] References Cited

UNITED STATES PATENTS 3,194,003 7/1965 Polin..................................58/23 R X 3,534,544 10/1970 Ogney et al.............................58/34 X

*Primary Examiner*—Richard B. Wilkinson

*Assistant Examiner*—Edith C. Simmons Jackman

*Attorney*—Blum, Moscovitz, Friedman & Kaplan

[57] ABSTRACT

A resetting apparatus for an electronic timepiece wherein a frequency divider circuit having a logic circuit incorporating complimentary MOST is provided with a control means for resetting said divider circuit which is also connected to the input amplifier of said divider circuit to cut said input amplifier off.

4 Claims, 5 Drawing Figures

Patented July 25, 1972 3,678,680

3 Sheets-Sheet 1

Patented July 25, 1972

3,678,680

3 Sheets-Sheet 3

ELECTRONIC TIMEPIECE

BACKGROUND OF THE INVENTION

This invention relates generally to electronic circuits incorporated in electric watches. In the art, such circuits have generally been provided with a power source switch which turns off the power source in order to avoid draining the battery during periods of non-operation. However, such arrangements result in an irregular time lag between the closing of the power switch in the first time signal, and also do not permit the application of power required to minimize aging of crystal oscillators.

SUMMARY OF THE INVENTION

Generally speaking, in accordance with the invention, a circuit for an electronic watch and the like is provided which includes a frequency divider circuit having a logic circuit incorporating complimentary metal-oxide semiconductor transistors; an input amplifier for applying a signal to said divider circuit; and control means coupled to said divider circuit and said input amplifier for resetting said divider circuit and cutting off said input amplifier. Said input amplifier may be an inverter. Said divider circuit may include a flip-flop circuit, each flip-flop step constituting a low frequency portion of said divider circuit.

The present invention relates to an improvement in the switching of a power source to stop the operation of an electronic watch. The arranGement according to the invention is particularly effective for electronic watches having a frequency divider incorporated with a direct coupled logic circuit, said circuit including a complementary MOST (Metal-Oxide-Semiconduct-Transistor).

The object of this invention is to provide a reset switch which eliminates unnecessary consumption of electric power by stopping the operation of the electronic circuits when the electronic watch is in a non-operating condition for a long time.

Another object of the invention is to eliminate the time delay of the output pulses of the divider circuit immediately after turning said switch on so that the second hand of the watch can start smoothly and immediately.

BRIEF DESCRIPTION OF THE DRAWINGS

FIG. 3 shows output pulses of a driving circuit of FIG. 1 when the power source switch is turned on;

DESCRIPTION OF THE PREFERRED EMBODIMENTS

Figure 1:
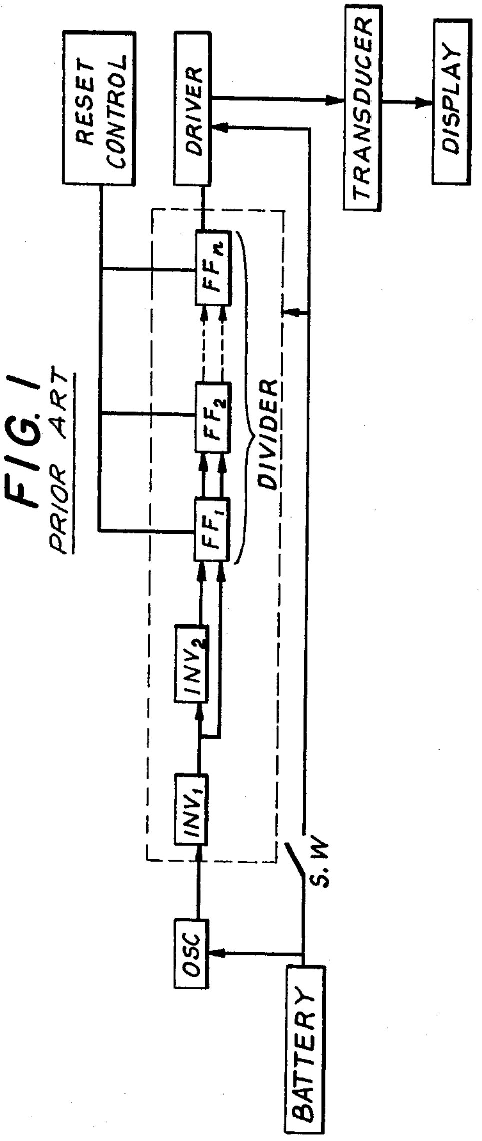
FIG. 1 PRIOR ART
FIG. 1 is a block diagram showing a construction of the conventional type of circuit for an electronic watch having a power source switch and a reset switch.

FIG. 1 shows a block diagram of the conventional type of electronic watch formed with a direct coupled logic circuit consisting of a complementary MOST.

An oscillation circuit (OSC) utilizes a mechanical cantilever vibrator or a crystal vibrator to generate a signal of a frequency from hundreds Hz to ten thousands Hz. To stop such a watch, the power source switch (S.W.) is turned off. However, it is desirable that the oscillation circuit remain connected with the power source in view of the aging of the oscillator. The output signal of the oscillation circuit is amplified reversely by two-stage inverters ($INV_1$ and $INV_2$which produce two signals the phase of which are reverse relative to each other. Said signals are applied to a divider circuit such as ripple counter ($FF_1$, $FF_2$, . . . $FF_n$). The divider circuit divides the high frequency signal applied thereto into a low frequency signal of 1 Hz to several 10 Hz for application to a driver which in turn is connected to an electro-mechanical transducer. The output signal of the frequency divider circuit is shaped and amplified into the normal wave form for the transducer by said driver and fed to the transducer which drives the time indicating wheels. A reset control resets the divider in a conventional manner. In a general portable electronic watch in which a battery is utilized and energy capacity is restricted, a power source switch (S.W.) is provided in the watch and turned off in order to eliminate the consumption of battery energy during the period that the watch is carried from the manufacturer to a customer. As shown in 3, if this power source switch is used instead of the reset switch according to the invention as described below, the first output pulse occurs a certain time ($\tau$) later than the time ($t$=0) at which the power source switch is turned on, and this time lag is irregular. As a result, in the case of a small sized watch, a reset switch has to be provided.

Figure 2:
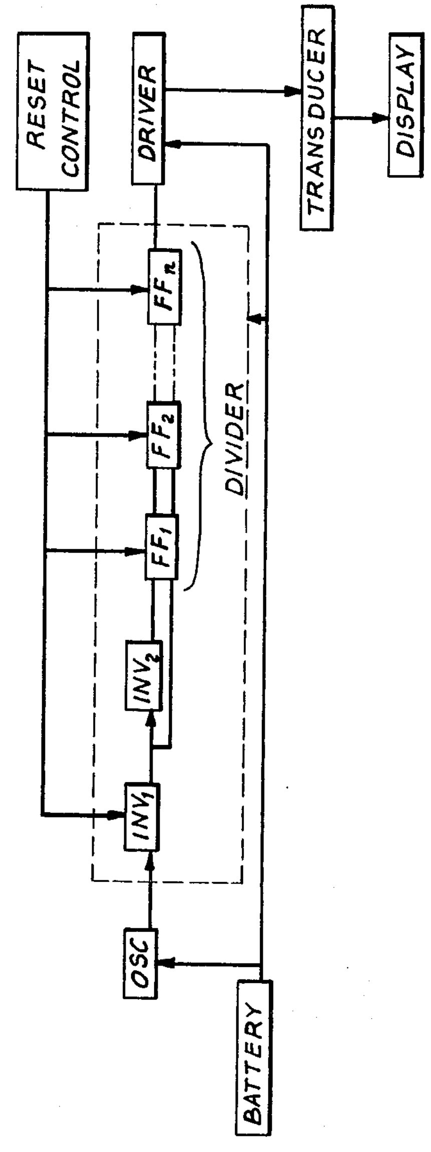
FIG. 2 is a block diagram showing a construction of the electronic watch circuit according to this invention.
Figure 3:
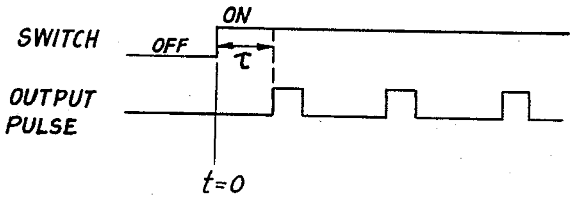

FIG. 2 is a block diagram of the electronic circuit using the resetting method according to the invention. When the input signal is cut off, the current consumption of the divider circuit and the driving circuit which consists of the complementary MOST, is only a trickle current and its value is very small and can be neglected.

In the case of a 14stage binary counter which is utilized with a quartz crystal watch and consists of complementary MOST, the consumption current at operating time is:

$$I = 5\ \mu A \text{ at } V_{DD} = 1.5 \text{ Volt}$$

Trickle current when the input signal is cut off is:

$$I = \text{less than } 0.1\ \mu A\ V_{DD} = 1.5 \text{ Volt}$$

Thus, the trickle current is almost the same as if the power source were cut off.

Figure 4:
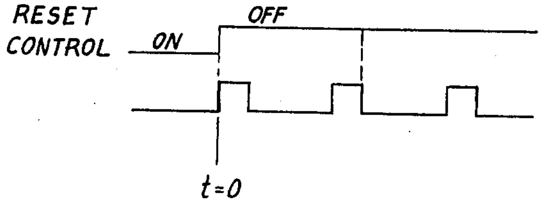
FIG. 4 shows output pulses of the driving circuit of FIG. 2 when the reset switch is turned off.

Consequently, when the divider circuit is reset and at the same time the input terminal of the inverter is cut off by the reset switch, the desired effect can be obtained without breaking off the power source circuit. The resetting method according to the invention as applied to the inverter is the same as the general reset operation applied to the divider. When the resetting means is turned on, the standard time signal output pulse is produced simultaneously as shown in FIG. 4.

Figure 5:
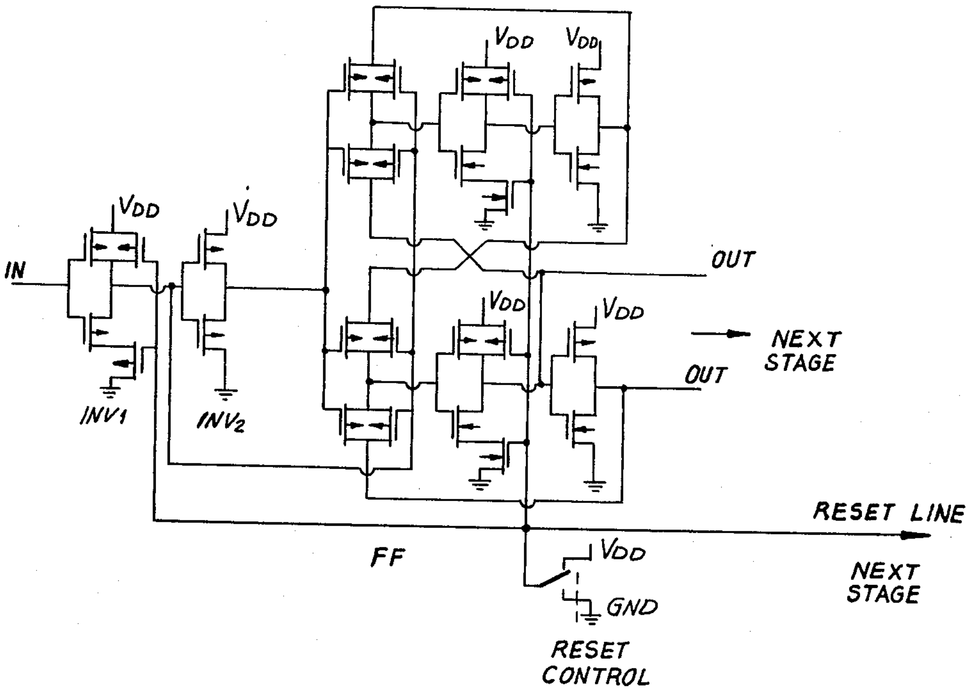
FIG. 5 shows one embodiment of the divider circuits including the inverter circuits, a flip-flop circuit and a reset circuit connected to the inverter and the divider circuits.

FIG. 5 shows one embodiment of the divider circuit including a ripple counter and complementary MOST. The output signal from the oscillation circuit is amplified reversely by inverter circuits $INV_1$ and $INV_2$ and, then supplied to the ripple counter. When the reset switch is turned from $V_{DD}$ to ground, the divider circuits are cut off. $INV_1$ is cut off at the same time, cutting off the input signal for the divider.

By adopting the resetting method according to the invention, the reset switch substantially serves as both the power source switch and the reset switch, a very advantageous arrangement for small sized watches in which electric power is restricted.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A circuit for an electronic timepiece, comprising a frequency divider circuit, an input amplifier coupled to the input of said divider circuit; a control element for simultaneously resetting said divider circuit and cutting off said input amplifier.

2. A circuit as recited in claim 1, wherein said frequency divider includes a logic circuit incorporating complementary MOST.

3. A circuit as recited in claim 1, wherein said frequency divider circuit is a ripple counter.

4. A circuit as recited in claim 1, wherein said divider circuit includes a multistep flip-flop circuit incorporating MOST, each of said flip-flop steps operating at a low frequency as compared to the input signal to said divider circuit.

* * * * *